United States Patent [19]
Furuya et al.

[11] Patent Number: 5,129,488
[45] Date of Patent: Jul. 14, 1992

[54] VIBRATION MODE RESPONSIVE VARIABLE DAMPING FORCE SHOCK ABSORBER WITH FEATURE OF AUTOMATIC SELECTION OF DAMPING MODE DEPENDING UPON VIBRATION MODE OF VEHICULAR BODY

[75] Inventors: Takayuki Furuya; Fumiyuki Yamaoka, both of Kanagawa, Japan

[73] Assignee: Atsugi Unisia Corporation, Japan

[21] Appl. No.: 612,856

[22] Filed: Nov. 14, 1990

[30] Foreign Application Priority Data

| | | |
|---|---|---|
| Nov. 16, 1989 [JP] | Japan | 1-298388 |
| Dec. 12, 1989 [JP] | Japan | 1-322898 |
| Dec. 12, 1989 [JP] | Japan | 1-322899 |

[51] Int. Cl.⁵ ............................................. F16F 9/50
[52] U.S. Cl. ............................. 188/282; 188/317; 188/322.15
[58] Field of Search .......... 188/282, 317, 322.15, 188/322.14, 315, 318

[56] References Cited

U.S. PATENT DOCUMENTS

| | | | |
|---|---|---|---|
| 4,453,638 | 6/1984 | Wallace | 188/282 |
| 4,610,332 | 9/1986 | Mourray | 188/322.15 |
| 4,620,619 | 11/1986 | Emura et al. | 188/282 |
| 4,832,162 | 5/1989 | Bacardit | 188/317 |
| 4,895,229 | 1/1990 | Kato | 188/317 |
| 4,953,671 | 9/1990 | Imaizumi | 188/282 |
| 4,972,928 | 11/1990 | Sirven | 188/282 |
| 4,997,068 | 3/1991 | Ashiba | 188/282 |

FOREIGN PATENT DOCUMENTS

| | | |
|---|---|---|
| 63-11401 | 4/1988 | Japan . |
| 2134624 | 8/1984 | United Kingdom . |

*Primary Examiner*—Joseph F. Peters, Jr.
*Assistant Examiner*—Christopher P. Ellis
*Attorney, Agent, or Firm*—Ronald P. Kananen

[57] ABSTRACT

A variable damping force shock absorber includes a cylinder tube defining therein two axially aligned fluid chambers separated by a piston. The fluid chambers are connected via first and second fluid paths for fluid communication therebetween. A high damping force generating valve is disposed in the first fluid path. A low damping force generating valve is disposed in the second fluid path. A variable orifice is also formed in the second fluid path. The variable orifice is associated with a control valve which adjusts fluid path area of the variable orifice. The control valve is axially shiftable for adjusting the orifice area. A pressure chamber is formed opposing one axial end of the control valve, which pressure chamber is in fluid communication with one of the fluid chamber via the variable orifice. A bias means is active on the other axial end of the control valve, remote from the pressure chamber, for exerting a bias force in a direction opposite to the force exerted by working fluid in the pressure chamber.

12 Claims, 6 Drawing Sheets

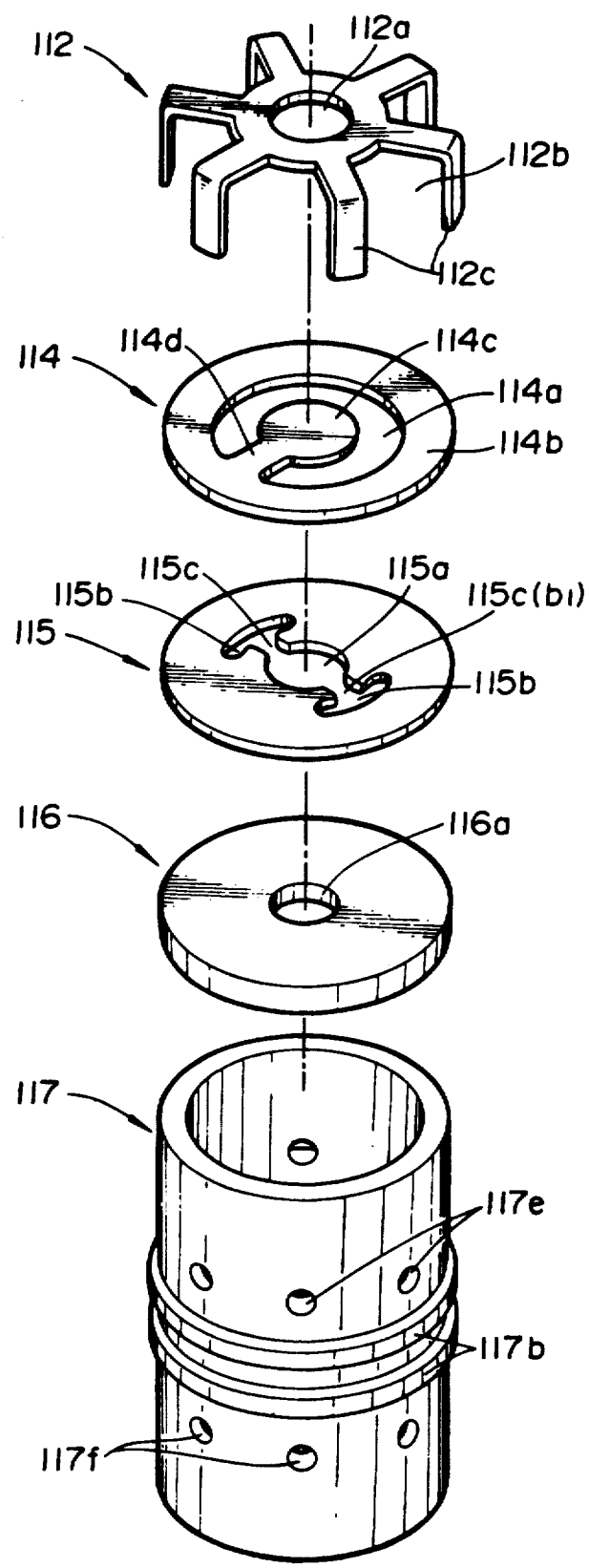

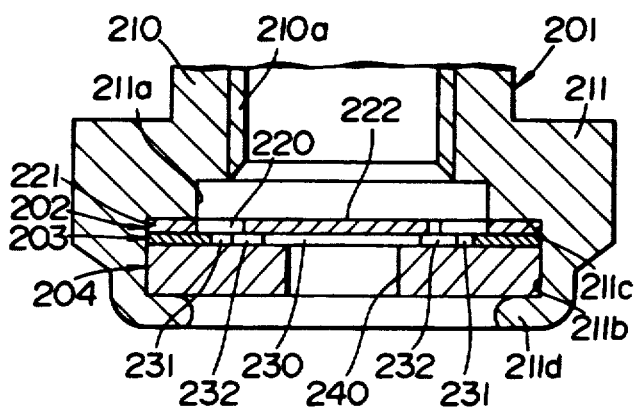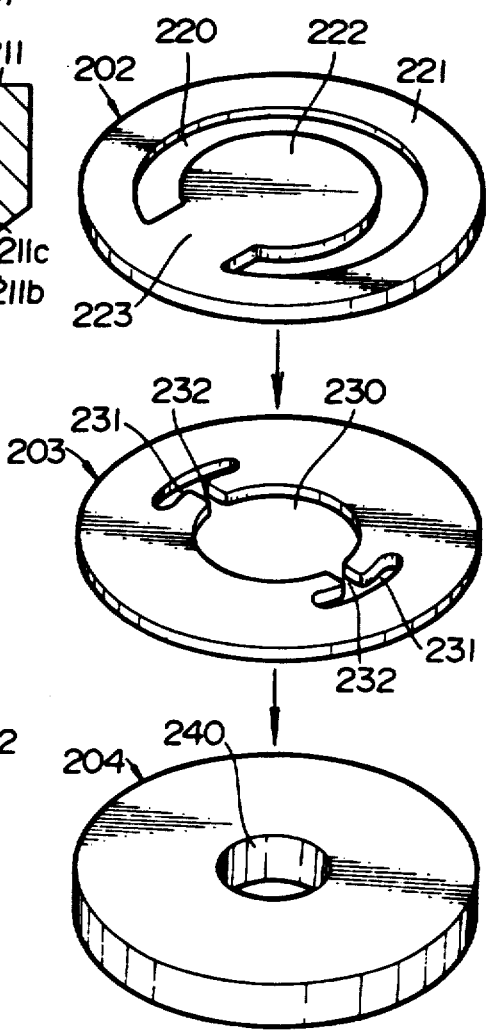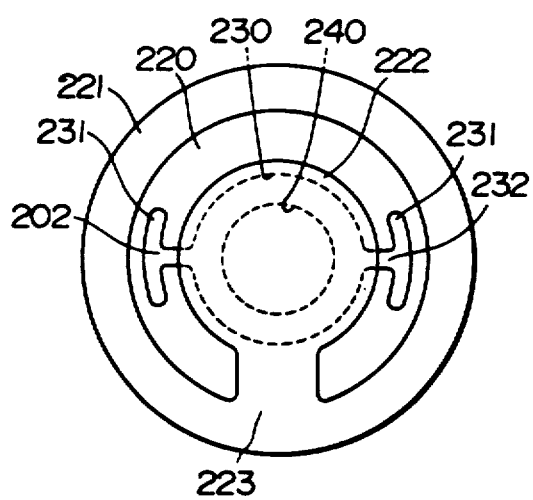

VIBRATION MODE RESPONSIVE VARIABLE DAMPING FORCE SHOCK ABSORBER WITH FEATURE OF AUTOMATIC SELECTION OF DAMPING MODE DEPENDING UPON VIBRATION MODE OF VEHICULAR BODY

BACKGROUND OF THE INVENTION

1. Field of the Invention

The present invention relates generally to a variable damping force shock absorber for an automotive suspension system. More specifically, the invention relates to a variable damping force shock absorber which automatically adjust the damping mode depending upon the mode of vibration input to a vehicular body.

2. Description of the Background Art

A typical construction of variable damping force shock absorber has been disclosed in Japanese Utility Model Second (Examined) Publication (Jikko) Showa 63-11401. The discloses variable damping force shock absorber has a lower fluid chamber communicating with an annular reservoir chamber defined between inner and outer cylinder tubes. Fluid communication between the lower fluid chamber and the reservoir chamber is established by means of a compression fluid path and a compression by-pass path. A damping valve is provided in the compression fluid path. On the other hand, a variable orifice is provided in the compression by-pass path. A valve spool is associated with the variable orifice for adjusting fluid flow path area in the variable orifice according to the position thereof.

With such a construction, the damping valve and the variable orifice are active during the piston compression or bounding stroke to restrict fluid flow through the compression fluid path and the compression by-pass path from the lower fluid chamber to the reservoir chambee and whereby generator damping force which suppresses relative displacement between the vehicular body as a sprung mass and a suspension member, such as a suspension arm, suspension link and so forth, which serves as an unsprung mass together with a road wheel. Where vibration is induced due to the action of the vehicular body, such as pitching, rolling and so forth, the vibration frequency is relatively low. The mode of such vibration caused by vehicular body action will be herafter referred to as "lower frequency mode of vibration" or "low frequency mode vibration". In the disclosed shock absorber, the valve spool in the variable orifice is responsive to such lower frequency mode vibration to shut or block fluid flow through the variable orifice. As a result, the fluid communication is established only through the compression fluid path. Therefore, high damping force is generated by means of the damping valve because of high flow restrictrion rate. Therefore, in such case, the shock absorber can operates in HARD mode.

On the other hand, when vibration is induced by vibration energy input from the road wheel due to undulation or uneven on the road surface, vibration frequency is relatively high. Such mode of vibration with the hereafter referred to as "high frequency mode of vibration" or "high frequency mode vibration" In such a case, the valve spool in the compression by-pass path is placed in a position to establish fluid communication therethrough. Therefore, fluid can flow from the lower fluid chamber to the reservoir chamber through both of the compression fluid path and the compression by-path. As a result, fluid flow amount is split between the compression fluid path and the compression by-pass path so as to generate smaller damping force for hydrodynamically absorbing vibration energy. Therefore, the shock absorber operates in SOFT mode.

On the other hand, in the case of the variable orifice, the fluid flow path area at the open position is maintained constant. Therefore, as is well known, the damping force to be generated becomes proportional to square of stroke speed of a piston in the shock absorber. Therefore, at relatively low piston speed range, damping force tends to become too small to obtain satisfactory stability of the vehicle. Of course, it is possible to obtain satisfactory damping force at the variable orifice by adjusting the path area of the orifice to be small enough to provide higher damping force. However, in such case, the damping force at relatively high piston speed range becomes unacceptably high. Therefore, it is difficult to achieve satisfactorily high damping force at relatively low frequency range with eliminating excess damping force at relatively high piston speed range.

On the other hand, while the variable orifice is shut off, dmaping force is solely generated by the damping valve which comprises a resiliently deformable valve disc which is seated on a valve seat at the normal position and is deformed to be shifted away from the valve seat to form the variable path area orifice for permitting fluid flow therethrough. In such case, the damping force to be generated by the damping valve is proportional to $\frac{1}{2}$ power of the piston stroke speed. Therefore, at relatively low piston speed range, the damping force variation rate is relatively large to cause excess damping force.

As can be appreciated, in order to optimize performance of the automotive suspension system, it is desirable to provide linear variation characteristics of the damping force relative to the piston stroke speed. Particularly, it is desirably to provide linear damping force variation characteristics at substantially low piston stroke speed range, such as less than or equal to 0.1 m/sec.

SUMMARY OF THE INVENTION

Therefore, it is an object of the present invention to provide a variable damping force shock absorber which can achieve linear variation of damping force and thus achieves good suspension characteristics through overall piston speed range.

In order to accomplish aforementioned and other objects, a variable daming force shock absorber, according to the present invention, includes a cylinder tube defining therein to axially alighed fluid chambers separated by a piston. The fluid chambers are connected via first and second fluid paths for fluid communication therebetween. A high damping force generating valve is disposed in the first fluid path. A low daming force generating valve is disposed in the second fluid path. A variable orifice is associated with a control valve which adjusts fluid path area of the variable orifice. The control valve is axially shiftable for adjusting the orifice area. A pressure chamber is formed opposed to one axial end of the control valve, which pressure chamber is in fluid communication with one of the fluid chambers via the variable orifice. A bias means is active on the other axial end of the control valve remote from the pressure chamber, for exerting bias force in a direction opposite to the force exerted by working fluid in the pressure chamber.

According to one aspect of the invention, a variable damping force shock absorber for an automotive suspensin system, comprises a hollow cylindr tube defining first and second fluid chambers therein;

first asn second fluid flow routes through which the first and second fluid chambers being communicated for fluid flow therethrough;

a first damping valve disposed within the first fluid flow route for generating greater damping force;

a second damping valve disposed within the second fluid flow route for generating smaller damper force; a vibration frequency responsive valve disposed within the second fluid flow route and movable between a first position for permitting fluid flow therethrough and a second position of blocking fluid flow therethrough, the vibration frequency responsive valve facing a pressure chamber at one axial end, which pressure chamber being in communication with one of the first and second fluid chambers via a vibration frequency dependent flow restriction means so as to establish fluid pressure in the pressure chamber for shifting the vibration frequency responsive valve from the first position to the second position in response to a vibration in a frequency range corresponding to mode of vibration induced by action of an unsprung mass of the vehicle; and a biasing means associated with the vibration frequency responsive valve for exerting biasing force for normally urging the vibration frequency responsive valve to the first position.

In the preferred construction, the first damping valve comprises a resiliently deformable disc valve seated at a plurality of valve seats arranged in tandem fashion with respect to the first fluid flow route. In such case, the first damping valve may comprise a first disc valve seated on an inner valve seat and a second disc valve seated on an outer valve seat, and the outer valve seat defining a constant path area orifice providing minimum fluid flow path area.

On the other hand, the vibration frequency dependent low restriction means may comprise an orifice means which blocks fluid flow from one of the first and second fluid chambers to the pressure chamber, generated by mode of vibration induced by a sprung mass so as to maintain the fluid force exerted on the vibration frequency responsive valve smaller than the biasing force exerted by the biasing means in a direction opposite to the fluid force. In such a case, the vibration frequency dependent flow restriction means comprises a flow restrictive orifice. The vibration frequency dependent flow restriction means may include an orifice means defining a first larger area fluid path and a second smaller area path, a check valve means associated with the orifice means for constantly permitting fluid flow through the second smaller area fluid path in a limited flow rate and for permitting fluid flow through the first larger area fluid path in a first direction and blocking fluid flow through the first larger area fluid path in a second direction opposite to the first direction. The vibration frequency dependent flow restriction means may further comprise a seat means defining a third fluid flow path having smaller path area than the first larger area fluid path and oriented in alignment with the first larger area fluid path, and the orifice means is seated on the seat means and formed of a resiliently deformable plate for causing deformation for establishing fluid communication between the second smaller area fluid path and the third fluid flow path. In application of the shock absorber, according to the invention, the check valve means is responsive to the first direction of fluid flow flowing from the pressure chamber to one of the first and second fluid chambers and to the second direction of fluid flow flowing from one of the first and second fluid chambers to the pressure chamber.

According to another aspect of the invention, a check valve assembly which permits fluid flow in a greater flow rate in a first direction and in a smaller flow rate in a second direction opposite to the first direction, comprising:

an orifice means defining a first larger area fluid path and a second smaller area path; and a check valve means associated with the orifice means for constantly permitting fluid flow through the second smaller area fluid path in a limited flow rate, permitting fluid flow through the first larger area fluid path in the first direction and blocking fluid flow through the first larger area fluid path in the second direction opposite to the first direction.

In this case, the check valve assembly may further comprise a seat means defining a third fluid flow path having a smaller path area than the first larger area fluid path and oriented in alignment with the first larger area fluid path, and the orifice means is seated on the seat means and formed of a resiliently deformable plate for causing deformation for establishing fluid communication between the second smaller area fluid path and the third fluid flow path.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 6 is an exploded perspective view of a piston valve assembly employed in the second embodiment of the variable damping force shock absorber of FIG. 5F FIG. 7 is a section of a bottom valve assembly construction applicable for the first and second embodiment of the variable damping force shock absorber;

FIG. 8 is a plan view of a check valve employed in the bottom valve assembly of FIG. 7; and FIG. 9 is an exploded perspective view of the check valve of FIG. 8.

DESCRIPTION OF THE PREFERRED EMBODIMENT

Figure 1:
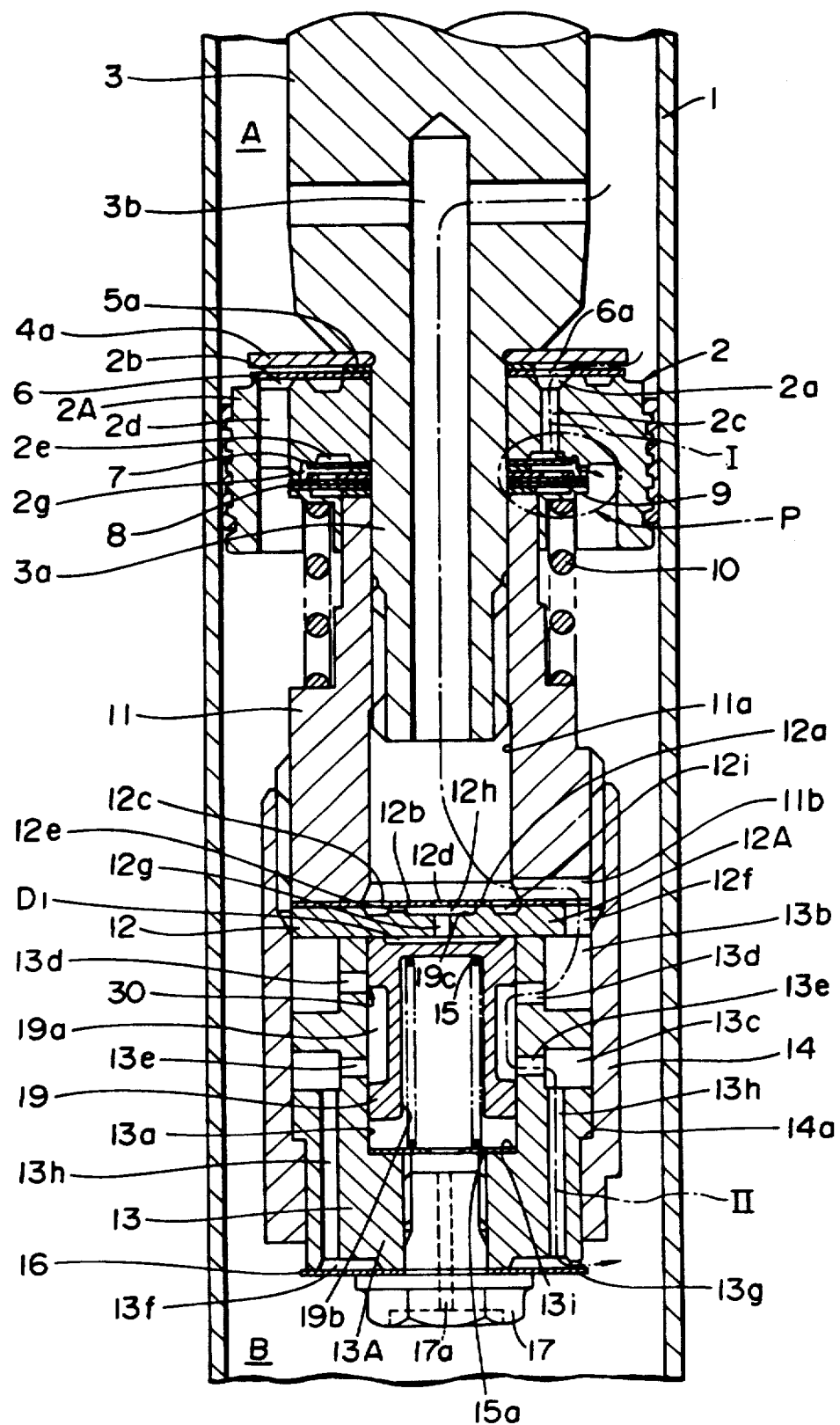
FIG. 1 is a section of the first embodiment of a variable damping force shock absorber according to the present invention.

Referring not to the drawings, particularly to FIG. 1, the preferred embodiment of a variable damping force shock absorber, according to the present invention, has a cylinder tube 1. A piston assembly 2 is disposed in the cylinder tube 1 within the interior space for thrustion motion. The piston assembly 2 forms a valve body for generating damping force. The piston assembly 2 separates the interior space of the cylinder tube 1 into upper and lower fluid chambers A and B. The upper and lower fluid chambers A and B are filled with a working fluid. The piston assembly 2 is rigidly fitted on the smaller diameter end section 3a of a piston rod 3. The piston rod 3 is formed with an axially extending bore 3b which opens to the lower end of the piston rod. The axially extending bore 3b is communiated with radially extending openings 3c which have outer ends opening to the upper fluid chamber A.

The piston assembly 2 comprises a retainer 4a, a washer 5a, a compression damping valve 6 which is active during piston compression or bounding stroke to generate damping force, a piston body 2A, an expansion first valve 7 which is active during piston expansion or rebounding stroke to generate high damping force, a washer 5b, a retainer 4b, an expansion second valve 8 which is also active during piston expansion stroke to generate high damping force, a washer 5c, a spring seat member 9, a set spring 10, and a nut 11. The components are assembled on the smaller diameter lower end section 3a of the piston rod 3 and fastened by the nut 11 threadingly engaged onto the threaded end of the piston rod.

The piston body 2A is formed with a concentrically formed inner and outer annular grooves 2a and 2b of the upper surface mating with the upper fluid chamber A. Respective of the inner and outer annular grooves 2a and 2b are communicated with the lower fluid chamber B via a plurality of axially extending communication paths 2c and 2d. The axially extending communication paths 2c are formed in a radially offset position with respect to the center axis of the piston rod 3 and opening into the inner annular grooves 2a. The axially extending communication paths 2c are designed to permit fluid flow from the upper fluid chamber A to the lower fluid chamber B. Therefore, these axially extending communication paths 2c will be hereafter referred to as "expansion stroke fluid paths". Similarly, the axially extending communication paths 2d are oriented radially outside of the expansion paths and opening to the outer annular groove 2b. These axially extending communication paths 2d are designed to permit fluid flow from the lower fluid chamber B to the upper fluid chamber A during piston compression or bounding stroke. Therefore, the paths 2d will be hereafter referred to as "compression stroke fluid paths". The inner and outer grooves 2a and 2b are closed by the essentially disc-shaped compression damping valve 6. The compression damping valve 6 is formed with one or more openings 6a at radial positions corresponding to the inner annular groove 2a so as to permit fluid flow therethrough. Therefore, the compression damping valve 6 closes the outer annular groove 2b. As seen, the compression damping valve 6 is resiliently seated on a valve seat land extending along the radially outer edge of the outer annular groove 2b. Therefore, the compression damping valve 6 and the assocatied valve seat land form variable path area orifice which varies fluid flow path area depending upon magnitude of resilient deformation of the compression damping valve depending upon the pressure difference between the lower and upper fluid chambers B and A.

Figure 2:
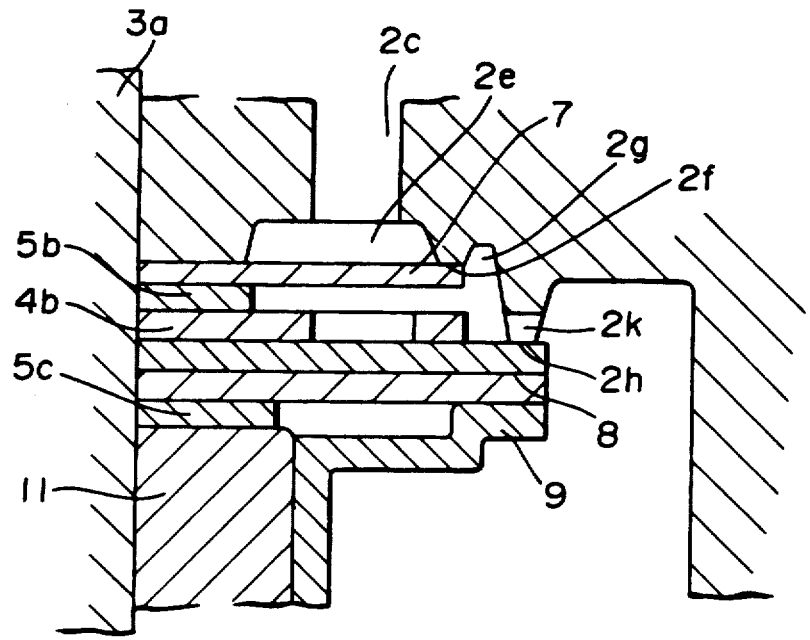
FIG. 2 is an enlarged sectoin of a piston valve in the first embodiment of the variable damping force shock absorber of FIG. 1, at the section encircled by a circle P in FIG. 1.
Figure 4:
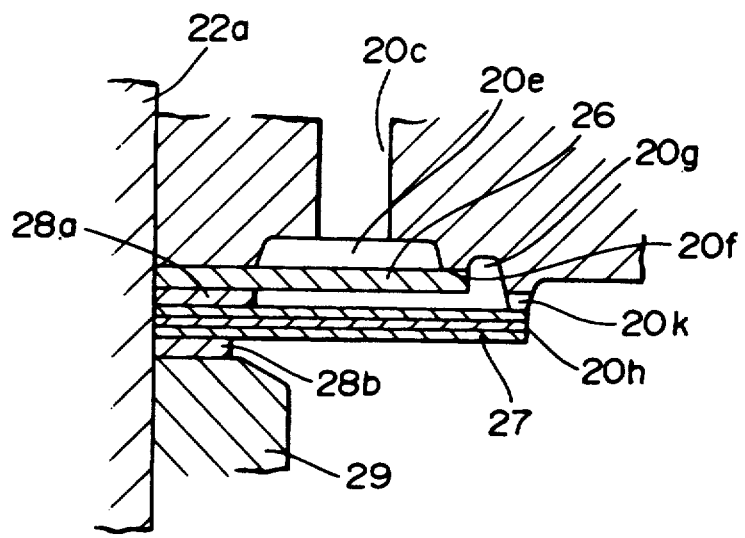
FIG. 4 is an enlarged section of a bottom valve in the first embodiment of the variable damping force shock absorber of FIG. 1, at the section encircled by a circuit S (in FIG. 3)

On ther other hand, the expansion stroke fluid paths 2c open to an annular groove 2e formed on the lower axial end surface of the piston body 2A. As better shown in FIG. 2, an annular valve seat land 2f are formed along the outer circumferential edge of the inner annular groove 2e. The first expansion damping valve 7 is seated on the annular valve seat land 2f for openably closing the inner annular groove 2e. An outer annular groove 2g is formed radially outside of the valve seat land 2f. Surrounding the outer annular groove 2g, an annular valve seat land 2h is formed. As can be seen, the annular valve seat land 2h has a valve seat surface oriented at axially offset position in relation to the valve seat surface of the valve seat land 2f. The second expansion damping valve 8 is seated on the valve seat land 2h for openably closing the outer annular groove 2g. The valve seat land 2h is formed with one or more radial orifice 2k which defines minimum fluid path area while the second expansion valve 8 is seated on the valve seat surface of the valve seat land 2h. Therefore, while the second expansion valve 8 is fully closed minimum flow rate of working fluid can flow from the upper fluid chamber A to the lower fluid chamber B. The spring seat member 9 is oriented in contact with the lower surface of the second expansion damping valve 8 for exerting set force of the set spring 10.

The nut 11 is formed with an axial opening 11a which is aligned with the axial bore 3b of the piston rod 3 in fluid communication therewith. The lower opening end of the axial opening 11a of the nut 11 is closed by means of a check and spool valve assembly 12. The check and spool valve assembly 12 has an essentially cylindrical housing 14, upper end of which is so designed as to threadingly engage with the axial lower end of the nut 11. The cylindrical housing 14 has smaller diameter section in the vicinity of the lower end thereof and defines a retainer shoulder 14a at the interface between the larger diameter section. A check valve assembly 12 and a spool valve assembly 13 are retained in the interior space of the cylindrical housing 14. The retainer shoulder 14a restricts axial movement of the check valve assembly 12 and the spool valve assembly 13.

The check valve assembly 12 has a check valve body 12A which is formed with an annular land 12a on which is seated a resiliently deformable check plate 12b. The check plate 12b is formed with a plurality of through openings 12c at an orientation offset radially outside of the valve seat surface of the annular land 12a. The check plate 12b is also formed with an axial orifice 12d. The axial orifice 12d establishes fluid communication between the axial opening 11a of the nut 11 and a center groove 12h formed on the upper surface of the check valve 12. On the other hand, the through openings 12c establishes fluid communication between the axial opening 11a of the nut 11 and an annular groove 12i defined onthe upper surface of the check valve and surrounding the center groove 12h. The annular groove 12i is in fluid communication with the center groove 12h via one or more radial orifices 12e. The center groove 12h is communicated with an axial orifice 12g.

The spool valve assembly 13 has a spool body 13A defining an axial opening 13a. The axial opening 13a opens to the upper end of the spool body 13A. Upper and lower annular grooves 13b and 13c are formed on the outer circumference of the spool body 13A. These annular grooves 13b and 13c are in fluid communication with the axial opening 13a via radial orifices 13d and 13e. The upper annular groove 13b is in fluid communication with the the axial opening 11a via a radial groove 11b formed onthe lower end of the nut 11 and an axial groove 12f formed on the outer circumference of the check valve body 12A. On the other hand, the lower annular groove 13c is in fluid communication with an annular groove 13f formed on the lower end surface of the spool body 13A via axial paths 13h. The annular groove 13f is closed by a third expansion damping valve 16 which is provided lower stiffness than that of the first and second expansion damping valves 7 and 8 and thus designed as low damping valve to generate lower damping force during piston expansion stroke. The third expansion valve 16 is seated on an annular valve seat land 13g.

A valve spool 19 is disposed within the axial opening 13a of the spool body 13A for axial movement. The valve spool 19 is formed in essentially cylindrical shape to define upper end closed axial bore 19b. The valve spool 19 is formed of an annular groove 19a on the outer circumference of the spool body 19. The axial length of the annular groove 19a is so selected as to establish fluid communication between the radial orifices 13d and 13e therethrough when the valve spool 19 is placed at upwardly shifted position. As can be seen from FIG. 1, the pair of radial orifices 13b are offset from each other. The magnitude mutual offset of the radial orifices 13b corresponds to the radius length of the orifice. The valve spool 19 further defines a center groove 19c which cooperates with the check valve body 12A to define a pressure chamber $D_1$. A bias spring 15 is disposed in the axial bore 19b of the valve spool 19 and seated on the upper wall closing the axial bore at the upper end. The lower end of the bias spring 15 is seated on a spring seat plate 15a which is seated on the annular shoulder 13i of the spool body 13. The bias spring 15 thus constantly biases the valve spool 19 upwardly to maintain fluid communication between the radial orifices 13d and 13e. As seen from FIG. 1, at the uppermost position of the valve spool 19, the upwardly offset one of the radial orifice 13b overlaps with the annular groove 19a of the valve spool 19 at the lower half thereof. Namely, the associated edges of the radial orifice 13b and the annular groove 19a form variable path area orifice 30 which is variable of fluid path area depending upon the axial position of the valve spool 19.

The lower end of the axial opening 13a of the spool body 13 is plugged by a plug bolt 17. The plug bolt 17 defines an axial orifice 17a to establish fluid communication between the axial opening 13a and the lower fluid chamber B.

With the shown construction, a first expansion stroke fluid flow route I is defined through the openings 6a of the compression damping valve 6, the inner annular grrove 2a, the expansion stroke fluid path 2c, the inner annular groove 2e and first and second expansion damping valves 7 and 8. On the other hand, second expansion stroke fluid flow route II is defined through the radial path 3c, the axial bore 3b, axial opening 11a, the radial groove 11b, the axial groove 12f, the annular groove 13b, the radial orifice 13d, the annular groove 19a, the radial orifice 13e, the annular groove 13c, the axial paths 13h and the annular groove 13f and the third expansion stroke damping valve 16.

Figure 3:
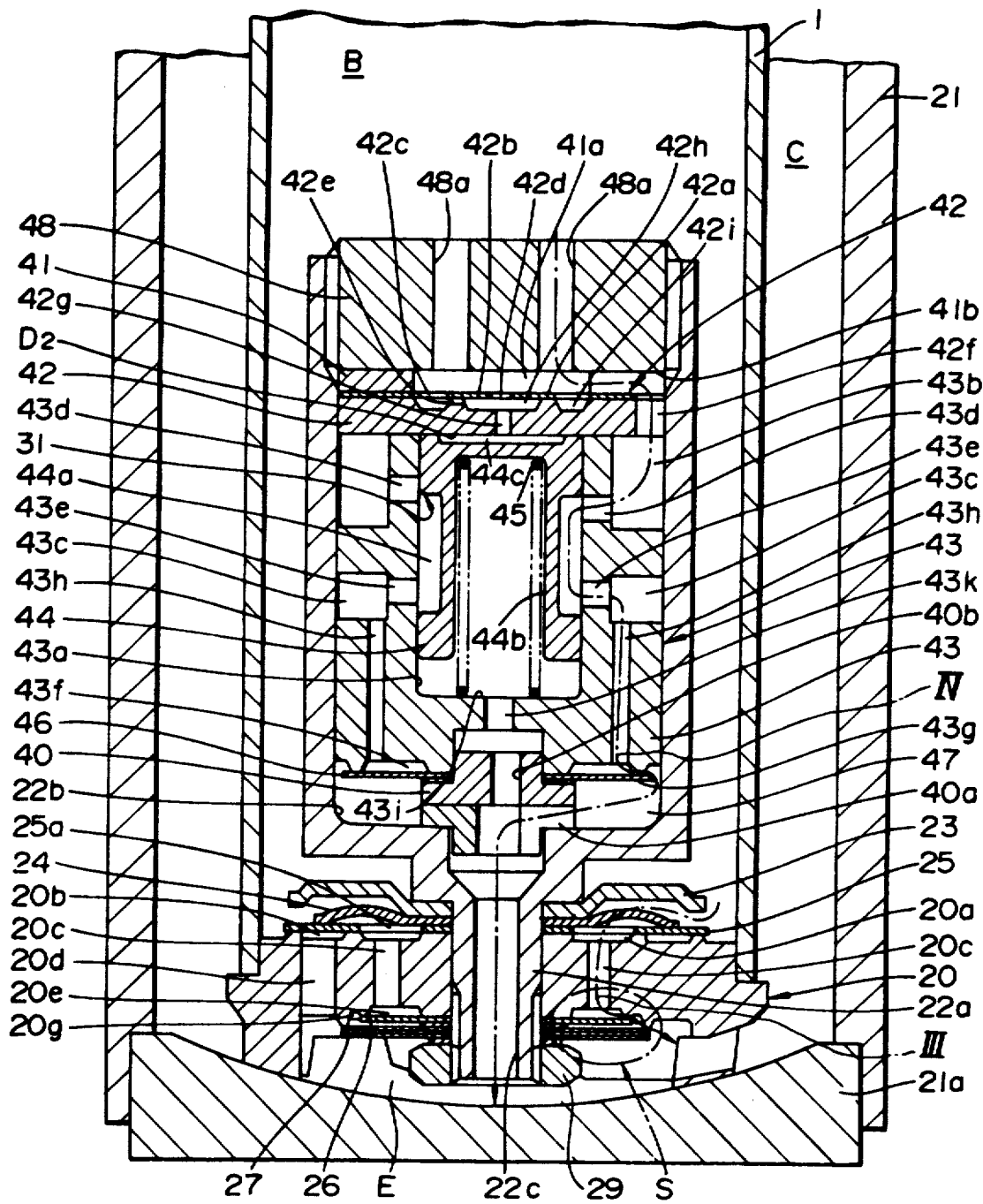
FIG. 3 is a section of a bottom valve employed in the first embodiment of the variable damping force shock absorber of FIG.

FIG. 3 shows a bottom valve assembly provided between the lower fluid chamber B and an annular fluid reservoir chamber C which is defined between inner an douter cylinder tubes 1 and 21 and in fluid communication with the lower fluid chamber B via a bottom chamber E defined between a bottom member 21a fitted on the bottom of the outer cylinder tube 21 and the bottom valve assembly 20. Similarly to the foregoing piston valve assembly, the bottom valve assembly 20 is associated with a check and spool valve assembly.

The bottom valve assembly 20 has a base body 20A fitted on the bottom of the inner cylinder tube 1. The bottom valve assembly 20 comprises a retainer 23, a check spring 24, a check plate 25, a first compression damping valve 26 which is high damping force valve, a washer 28a, a second compression damping valve 27 which is also high damping force valve, a washer 28b and a fastening nut 29. Aforementioned components are assembled to a small diameter section 22a of a housing 22 of the check and spool valve assembly.

The base body 20A is formed with concentrically arranged inner and outer grooves 20a and 20b on the upper surface opposing to the lower fluid chamber B. The inner and outer grooves 20a and 20b are respectively communicated with a compression stroke fluid path 20c and an expansion stroke fluid path 20d. The compression stroke fluid path 20c opens to an inner annular groove 20e formed on the lower surface of the base body 20A. On the other hand, the expansion stroke fluid path 20d directly opens to the bottom chamber E.

The check plate 25 is biased to close the outer annular groove 20b. Therefore, the check plate 25 permits fluid flow only in the direction from the bottom chamber E to the lower fluid chamber B. The check plate 25 is formed with through openings 25a for establishing fluid communication between the lower fluid chamber B and the inner annular groove 20a. Therefore, the inner annular groove 20a is constantly open to the lower fluid chamber.

A valve seat land 20f extends along the outer circumference of the inner angular groove 20e. On the valve seat surface of the valve seat land 20f, the first compression damping valve 26 is seated. Therefore, the first compression damping valve 26 openably closes the inner annular groove 20e. An outer annular groove 20g is formed radially outside of the valve seat land 20f. A valve seat land 20h is formed along the circumference of the annular groove 20g. The second compression damping valve 27 is seated on the valve seat land 20h. Therefore, the outer annular groove 20g is openably closed by the second compression damping valve 27. One or more radial orifices 20k are formed inthe valve seat land 20h for maintaining minimum or restricted flow rate of fluid flow.

The housing 22 of the check and spool valve assembly defines an essentially cylindrical and upper end opened bore 22b. The upper end of the housing 22 is closed by an upper end closure disc 48. The upper end closure disc 48 has threaded outer periphery which engaged with threaded inner periphery of the upper end of the housing 22. A check valve assembly 42 is oriented beneath the upper end closure disc 48. An annular spacer ring 41 is disposed between the upper end closure disc 48 and the check valve assembly 42. The upper end closure disc 48 is formed with axially extending paths 48a extending axially. The spacer ring 41 defines an essentially circular chamber 41a between the upper end closure disc 48 and the check valve assembly 42.

The check valve assembly 42 has a check valve body 42A which is formed with an annular land 42a on which is seated on a resiliently deformable check plate 42b. The check plate 42b is formed with a plurality of through openings 42c at an orientation offset radially outside of the valve seat surface of the annular land 42a. The check plate 42b is also formed with an axial orifice 42d. The axial orifice 42d establishes fluid communication between the circular chamber 41a of the spacer ring 41 and a center groove 42h formed on the upper surface of the check valve body 42A. On the other hand, the through openings 42c establishes fluid communication between the circular chamber 41a and an annular groove 42i defined on the upper surface of the check valve and surrounding the center groove 42h. The annular groove 42i is in fluid communication with the center groove 42h via one or more radial orifices 42e. The center groove 42h is communicated with an axial orifice 42g.

The spool valve assembly 43 has a spool body 43A defining an axial opening 43a. The axial opening 43a opens to the upper end of the spool body 43A. Upper and lower annular grooves 43b and 43c are formed on the outer circumference of the spool body 43A. These annular grooves 43b and 43c are in fluid communication with the axial opening 43a via radial orifices 43d and 43e. The upper annualr groove 43b is in fluid communication with the the circular chamber 41a via a radial groove 41b formed in the spacer ring 41 and an axial groove 42f formed an the outer circumference of the check valve body 42A. On the other hand, the lower annular groove 43c is in fluid communication with an annular groove 43f formed on the lower end surface of the spool body 43A via axial paths 43h. The annular groove 43f is closed by a third expansion damping valve 46 which is provided lower stiffness than that of the first and second expansion damping valves 26 and 27 and thus designed as low damping vlave to generate lower damping force during piston expansion stroke. The third expansion valve 46 is seated on an annular valve seat land 43g.

A valve spool 44 is disposed within the axial opening 43a of the spool body 43A for axial movement. The valve spool 44 is formed in essentially cylindrical shape to define upper end closed axial bore 44b. The valve spool 44 is formed of an annular groove 44a on the outer circumference of the spool body 44. The axial length of the annular groove 44a is so selected as to establish fluid communication between the radial orifices 43d and 43e therethrough when the valve spool 44 is placed at upwardly shifted position. As can be seen from FIG. 3, the pair of radial orifices 43b are offset from each other. Magnitude of mutual offset of the radial orifices 43b corresponds radius length of the orifice. The valve spool 44 further defines a center groove 44c which cooperates with the check valve bodyh 42a to define a pressure chamber $D_2$. A bias spring 45 is disposed in the axial bore 44b of the valve spool 44 and seated on the upper wall closing the axial bore at the upper end. The lower end of the bias spring 45 is seted on the annular shoulder 43i of the spool body 13. The bias spring 45 thus constantly biases the valve spool 44 upwardly to maintain fluid communicaton between the radial orifices 43d and 43e. As seen from FIG. 3, at the upper most position of the valve spool 44, the upwardly offset one of the radial orifice 43b overlaps with the annular groove 44a of the valve spool 44 at the lower half thereof. Namely, the associated edges of the radial orifice 43b and the annular groove 44a form variable path area orifice 31 which is variable of fluid path area depending upon the axial position of the valve spool 44.

The lower end of the axial opening 43a of the spool body 44 is plugged by an upper end plug 40A which is coupled with a lower end plug 40B. The end plugs 40A and 40B defines an axial orifice 40b to establish fluid communication between the axial opening 43a and the bottom chamber E.

With the shown construction, a first expansion stroke fluid flow route III is defined through the openings 25a of the compression damping valve 25, the inner annular groove 20a, the expansion stroke fluid path 20c, the inner annular groove 20e and first and second expansion damping valves 26 and 27. On the other hand, second expansion stroke fluid flow route IV is defined through axial openings 48a, the circular chamber 41a, the radial groove 41b, the axial groove 42f, the annular groove 43b, the radial orifice 43d, the annular groove 44a, the radial orifice 43e, the annular groove 43c, the axial paths 43h and the annular groove 43f, the third expansion stroke damping valve 46, a radial path 40a defined in the lower end plug 40B and an axial path 22c defined in the smaller diameter section of the housing 22.

With the construction set forth above, the valve spool 44 is normally placed at the uppermost position with the upward spring force of the spring 45. When the fluid pressure is increased in the lower fluid chamber B according to the piston compression stroke, the valve spool 44 is shifted downwardly to the position where force balance between the spring force and the fluid force in the pressure chamber $D_2$ is established. Therefore, according to the position of the position of the valve spool 44, fluid flow path area through the route IV is varied.

The operation of the aforementioned first embodiment of the variable damping force shock absorber will be discussed herebelow.

During piston expansion stroke, the piston assembly 2 is shifted upwardly with compressing the upper fluid chamber A. As a result, the fluid pressure in the upper fluid chamber A becomes higher than that of the lower fluid chamber B. Therefore, fluid flow from the upper fluid chamber A to the lower fluid chamber B is induced. At the same time, because of expansion of volume of the lower fluid chamber B, the fluid pressure in the lower fluid chamber is lowered to destroy pressure balance between the lower fluid chamber and the reservoir chamber C. Therefore, fluid flow from the reservoir chamber C to the lower fluid chamber B is induced.

At the initial stage of the piston stroke, the fluid pressure in the upper fluid chamber A is not so high to overcome the spring force of the set spring 10. Therefore, the valve spool 19 is maintained at the upper most position to maintain fluid communication through the route II. The shock absorber then operates in SOFT mode. As a result, the working fluid in the upper fluid chamber a flows through both of the routes I and II.

The working fluid flowing through the route I causes deformation of the first expansion damping valve 7 to flow into the outer groove 2g. When the fluid pressure is not so high, the fluid in the outer annular chamber 2g flows through the radial orifice 2k. In such case, the damping force is generated by flow restriction at the first expansion damping valve 7 and the radial and constant path area orifice 2k. On the other hand, when the fluid pressure in the outer annular groove 2g overcomes the spring force of the second expansion damping valve 8, the damping force is generated by flow restriction at both of the first and second expansion damping valves 7 and 8. On the other hand, the working fluid flowing through the route II flows through the variable path area orifice 30 and through the third expansion damping valve. Since the damping force generation characteristics of the third expansion damping valve 16 is set to generate smaller damping force, the damping force to be generated in the route II essentially depends on the fluid flow path area in the variable path area orifice 30.

Since the variable path area orifice 30 operates as constant orifice unless the valve position is changed, the damping force to be generated is variable in proportion to square of the piston stroke speed. Therefore, the damping characteristics of the damping force generated in the fluid flow route II becomes essentially proportional to square of the piston stroke speed. On the other hand, since the damping force to be generated in the fluid flow route I is variable depending upon deformation magnitude inthe first and second expansion damping valves 7 and 8, the damping force varies substantially in proportion to ⅓ power of the piston stroke speed.

On the other hand, when the fluid pressure in the upper fluid chamber overcomes the set spring force of the spring 15. Therefore, the valve spool 19 is shifted downwardly to block fluid communication between the annular grooves 13b and 13c. As a result, the operation mode fothe shock absorber becomes HARD mode. In such case, while the fluid pressure in the outer annular groove 2g is insufficient for overcoming the resilient biasing force of the second expansion damping valve, the damping force is generated by the variable orifice at the first expansion damping valve 7 and the constant orifice 2k at the second expansion damping valve. Therefore, at the first expansion damping valve 7, the damping force proportional to ⅓ power of the piston stroke speed is generated. At the same time, the damping force proportional to square of the piston stroke speed is generated at the constant orifice. Therefore, the damping characteristics becomes substantially linear. On the other hand, when the fluid pressure in the outer annular groove 2g overcomes the resilient biasing force of the second expansion damping valve 8, the working fluid flows through the variable orifice formed by deformation of the second expansion damping valve 8. At this condition, damping force generated by the first and second expansion damping valves 7 and 8 become proportional to ⅓ power of the piston stroke speed. At this time, because of difference of phase of damping force generated by the first and second expansion damping valves, substantially linear variation characteristics of the damping force can be obtained.

As can be appreciated herefrom. substantially linear variation characteristics of damping force in relation to the piston stroke speed can be obtained in overall piston stroke speed range.

During the operation set forth above, the fluid pressure level in the pressure chamber $D_1$ is variable depending upon vibration frequency. Namely, since the constant orifice 12e and 12d of the check plate 12c serves for cutting the high frequency component so as not to introduce the pressurized fluid into the pressure chamber $D_1$, the fluid pressure in the pressure chamber $D_1$ is maintained low irrespective of the fluid pressure int he upper fluid chamber A. On the other hand, when the vibration frequency is lower than a predetermined level, the pressurized working fluid can be introduced into the pressure chamber $D_1$. As a result, the fluid pressure in the pressure chamber $D_1$ increases to overcome the spring force of the set spring 15, the valve spool 19 is shifted downwardly to block fluid communication between the annular grooves 13b and 13c. Furthermore, in the shown embodiment, since the set spring 15 normally biases the valve spool upwardly to maintain the latter at the SOFT mode position, shifting of the valve spool is caused only when the fluid pressure in the pressure chamber $D_1$ overcomes the spring force. Therefore, as far as the fluid pressure in the upper fluid chamber in responsive to relatively low frequency vibration is maintaihned to be smaller than the force of the spring, the valve spool can be maintained at the SOFT mode position.

In the piston compression stroke, the bottom valve assembly and the check and spool valve assembly associated with the bottom valve assemlby cooperates to perform substantially the same operation to that discussed hereabove. Namely, the valve spool is selectively placed at SOFT mode position to establish fluid communication between the annular grooves 43b and 43c and HARD mode position to block the fluid communication. Vibration frequency and piston stroke speed dependency in shifting of the valve spool 44 is provided inthe same manner to that of the valve spool 19 in the piston assembly.

In the compression stroke, fluid flow routes III and IV are established in SOFT mode to generate substantially linearly varying damping force relative to the piston stroke speed. On the other in HARD mode, the fluid communication is established only through the route III. As discussed with respect to the piston expansion stroke, linear damping characteristics can be obtained in overall piston speed range either in SOFT and HARD mode.

Figure 5:
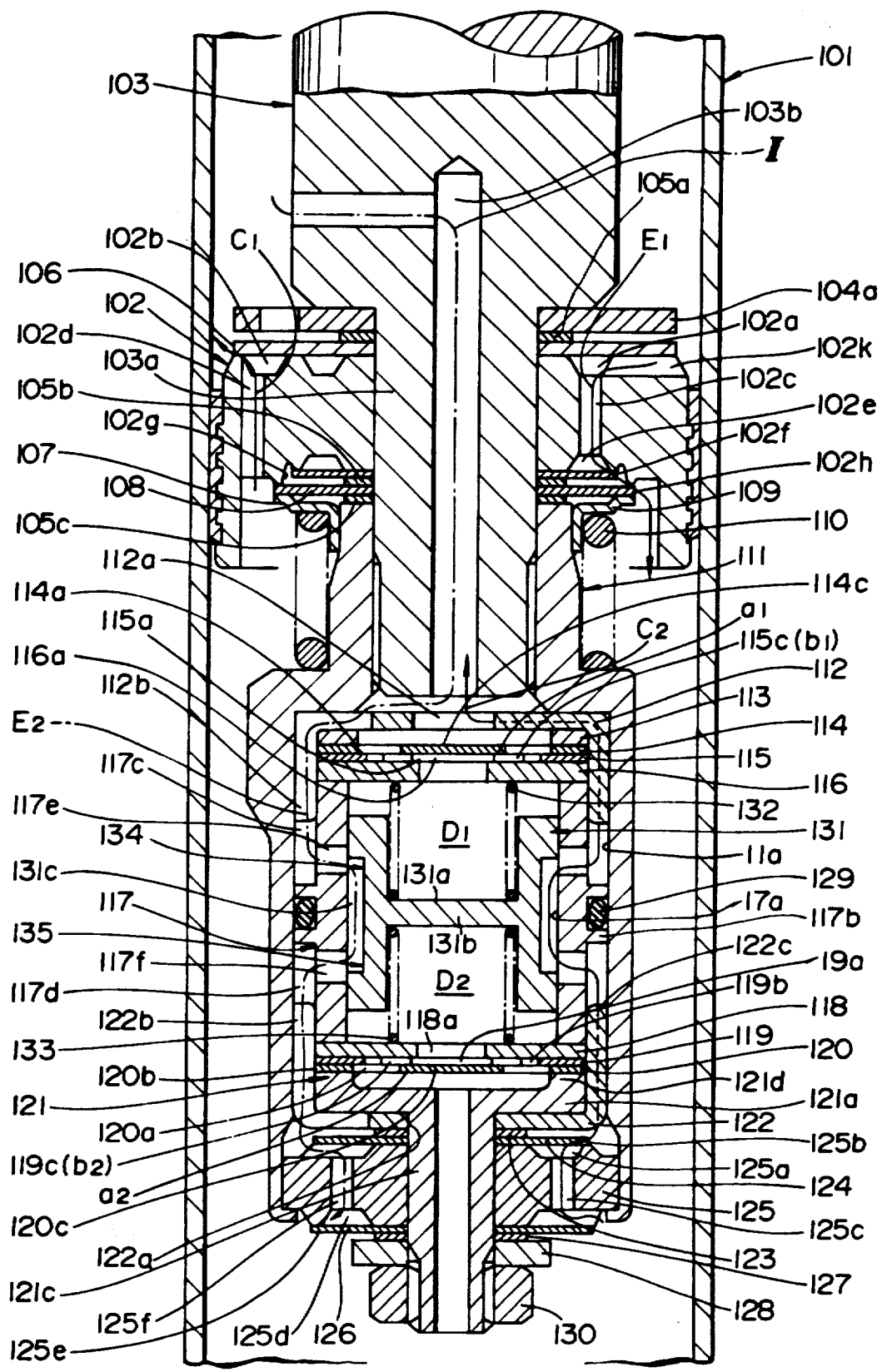
FIG. 5 is a section of the second embodiment of a variable damping force shock absorber according to the invention.

FIG. 5 shows major part of the second embodiment of the variable damping force shock absorber, according to the present invention.

As shown in FIG. 5, the second embodiment of a variable damping force shock absorber, according to the present invention, has a cylinder tube 101. A piston assembly 102 is disposed in the cylinder tube 101 within the interior space for thrusting motion. The piston assembly 102 forms a valve body for generating damping force. The piston assembly 102 separates the interior space of the cylinder tube 101 into upper and lower fluid chambers A and B. The upper and lower fluid chambers A and B are filled with a working fluid. The piston assembly 102 is rigidly fitted on the smaller diameter end section 103a of a piston rod 103. The piston rod 103 is formed with an axially extending bore 103b which opens to the lower end of the piston rod. The axially extending bore 103b is communicated with radially extending openings 103c which have outer ends opening to the upper fluid chamber A.

The piston assembly 102 comprises a retainer 104a, a washer 105a, a compression damping value 106 which is active during piston compression or bounding stroke to generate damping force, a piston body 102A, an expansion first valve 107 which is active during the piston expansion or rebounding stroke to generate high damping force, a washer 105b, an expansion second valve 108 which is also active during the piston expansion stroke to generate high damping force, a washer 105c, a spring seat member 109, a set spring 110, and a nut 111. The components are assembled on the smaller diamter lower end section 103a of the piston rod 103 and fastened by the nut 111 threadingly engaged onto the threaded end of the piston rod.

The piston body 102A is formed with a concentrically formed inner and outer annular grooves 102a and 102b of the upper surface mating with the upper fluid chamber A. The inner and outer annular grooves 102a and 102b are communicated with the lower fluid chamber B via a plurality of axially extending communication paths 102c and 102d, respectively. The axially extending communication paths 102c are formed radially offset with respect to the center axis of the piston rod 103 and opening into the inner anular grooves 102a. The axially extending communication paths 102c are designed to permit fluid flow from the upper fluid chamber A to the lower fluid chamber B. Therefore, these axially extending communication paths 102c will be hereafter referred to as "expansion stroke fluid paths". Similarly, the axially extending communication paths 102d are oriented radially outside of the expansion paths and open to the outer annular groove 102b. These axially extending communication paths 102d are designed to permit fluid flow from the lower fluid chamber B to the upper fluid chamber A during piston compression or bounding stroke. Therefore, the paths 102d will be hereafter referred to as "compression stroke fluid paths". The inner and outer grooves 102a and 102b are closed by the essentially disc-shaped compression damping valve 106. A radial path 102k is formed for fluid communication between the upper fluid chamber A and the inner annular groove 102a for establishing direct fluid communication therebetween. The compression damping valve 106 closes the outer annular groove 102b which is discontinued by the radial path 102k and is blocked from fluid communication with the radial path 102k. As seen, the comporession damping valve 106 is resiliently seated on a valve seat land extending along the radially outer edge of the outer annular groove 102b. Therefore, the compression damping valve 106 and the associated valve seat land form a variable path area orifice which varies the fluid flow path area depending upon magnitude of resilient deformation of the compression damping valve depending upon pressure difference between the lower and upper fluid chambers B and A.

On the other hand, the expansion stroke fluid paths 102c open to an inner annular groove 102e formed on the lower axial end surface of the piston body 2A. An annular valve seat land 102f are formed along the outer circumferential edge of the inner annular groove 102e. The first expansion damping valve 107 is seated on the annular valve seat land 102f for openably closing the inner annular groove 102e. An outer annular groove 102g is formed radially outside of the an valve seat land 102f. Surrounding the outer annular groove 102g, an annular valve seat land 102h is formed. As can be seen, the annular valve seat land 102h has a valve seat surface oriented at an axially offset position in relation to the valve seat surface of the valve seat land 102f. The second expansion damping valve 108 is seated on the valve seat land 2h for openably closing the outer annular groove 102g. The valve seat land 102h is formed with one or more radial orifices which defines a minimum fluid path area while the second expansion valve 108 is seated on the valve seat surface of the valve seat land 102h. Therefore, while the second expansion valve 108 is fully closed, a minimum flow rate of working fluid can flow from the upper fluid chamber A to the lower fluid chamber B. The spring seat member 109 is oriented in contact with the lower surface of the second expansion damping valve 108 for exerting the set force of the set spring 110.

The nut 111 is formed with an axial opening 111a which is aligned with the axial bore 103b of the piston rod 103 in fluid communication therewith. The lower opening end of the axial opening 111a of the nut 111 is closed by means of a check and spool valve assembly 112. The check and spool valve assembly 112 comprises a retainer 112, a washer 113, an expansion check plate 114, an expansion orifice plate 115, an expansion seat plate 116, a spool body 117, a compression seat plate 118, a compression orifice plate 119, a compression check plate 120, a stud 121, a retainer 122, a washer 123, a compression low damping valve 124, a sub-valve body 125, an expansion low damping valve 126, a washer 127, a retainer 128. The spool body 117 has an essentially cylindrical configuration. The spool body 117 is formed with an annular projection 117b carrying a seal ring 129 which establishes a liquid tight seal between the inner periphery of the axial opening 111a.

The retainer 112 is formed of a thin plate and is formed with a center opening 112a. The retainer 112 is formed with a cut-out 112b. As shown in FIG. 6, vertically bent legs 112c are formed by vertically bending the radially extending section of the retainer 112. The expansion check plate 14 is also formed with a thin plate and is formed with arc shaped through openings 114a. As can be shown, the expansion check plate 114 has a ring shaped circumferential section 114b which is stationarily secured between the washer 113 and the expansion orifice plate 115, a central and essentially circular valve section 114c and a radial stem section 114d extending between the sections 114b and 114c. The expansion orifice plate 115 is also formed with a thin plate and formed with a center opening 15a having smaller diameter than that of the valve section 114c of the expansion check valve 114. The expansion orifice valve 115 is also formed with a pair of arc-shaped elongated openings 115b connected between the center opening 115a via narrow cut-out sections 115c. The radial position of the openings 115b corresponds to the radial position of the arc-shaped opening 114a of the expansion check plate 114. Furthermore, the circumferential length of the arc-shaped opening 115b is longer than the circumferential width of the radial stem section 114d of the expansion check plate 114.

The expansion seat plate 116 is formed of a relatively thick plate and is formed with a center opening 116a which has smaller diameter than that of the center opening 115a of the expansion orifice plate 115. The washer 13, the expansion check plate 114, the expansion orifice plate 115 and the expansion seat plate 116 are provided with equal external diameters to that of the spool body 117. These components are assembled and retained between the retainer 112 and the upper end of the spool body 117. As can be seen, the legs 112c of the retainer 12 are inserted within the annular space defined between the inner periphery of the axial bore 111a and the outer periphery of the spool body 117.

With the shown construction, the upper circumferential edge of the center opening 115a of the expansion orifice plate 115 forms a valve seat surface $a_1$ for the valve section 114c of the expansion check plate 114. Also, the narrow cut-out section 115c forms expansion orifice $b_1$. Therefore, by thickness of the expansion orifice plate 115 and the width of the cut-out 115c, the flow restrictive fluid flow path area is defined.

The retainer 122, the compression seat plate 118, the compression orifice plate 119, the compression check plate 120 are formed and assembled in the symmetrical construction to that set forth above. Therefore, the retainer 122 is formed of a thin plate and is formed with a center opening 122a. The retainer 122 is formed with a cut-out 122b. As shown in FIG. 6, vertically bent legs 122c are formed by vertically bending the radially extending section of the retainer 122. The compression check plate 120 is also formed with a thin plate and is formed with arc shaped through openings 120a. As can be shown the compression check plate 120 has a ring shaped circumferential section 120b which is stationarily secured between annular shoulder 121d and the compression orifice plate 119, a central and essentially circular valve section 120c and a radial stem section 120d extending between the sections 120b and 120c. The compression orifice plate 119 is also formed with a thin plate and formed with a center opening 119a having smaller diameter than that of the valve section 120c of the expansion check valve 120. The compressioin orifice valve 119 is also formed with a pair of arc-shaped elongated openings 119b connected between the center opening 119a via narrow cut-out sections 119c. The radial position of the openings 119b corresponds to the radial position of the arc-shaped opening 120a of the compression check plate 120. Furthermore, the circumferential length of the arc-shaped opening 119 is longer than the circumferential width of the radial stem section 120d of the compression check plate 120.

The compression seat plate 118 is formed of a relatively thick plate and is formed with a center opening 118a which has smaller diameter than that of the center opening 119a of the compression orifice plate 119. The compression check plate 120, the compression orifice plate, 119 and the compression seat plate 118 are provided with equal external diameters to that of the spool body 117. These components are assembled and retained between the retainer 122 and the upper end of the spool body 117. As can be seen, the legs 122c of the retainer 122 are inserted within the annular space defined between the inner periphery of the axial bore 111a and the outer periphery of the spool body 117.

With the shown construction, the upper circumferential edge of the center opening 119a of the compression orifice plate 119 forms a valve seat surface $a_2$ for the valve section 120c of the compression check plate 114. Also, the narrow cut-out section 119c forms compression orifice $b_2$. Therefore, by thickness of the compression orifice plate 119 and the width of the cut-out 119c, the flow restrictive fluid flow path area is defined.

The stud 121 is formed with a larger diameter section 121a with the annular shoulder 121d, and a smaller diameter section 121c defining an axial opening 121b. To the smaller diameter section 121c, the retainer 122, the washer 123, the compression low damping valve 124, the sub-valve body [E]125, expansion low damping valve 126, the washer 127, the retainer 128 are assembled and fixed by a fastening nut 130. An annular groove 125a is formed on the upper surface of the sub-valve body 125 which is openably closed by means of the compression low damping valve 124. The annular groove 125a is communicated with the lower fluid chamber B via an axial path 125c. On the other hand, annular groove 125d is formed on the lower surface of the sub-valve body 125 which is openably closed by means of the compression low damping valve 126 and is communicated with the axial bore 111a via the fluid path 125f.

A valve spool 131 is disposed within the interior space 117a of the spool body 117. The valve spool 131 defines expansion and compression pressure chambers $D_1$ and $D_2$. The valve spool 131 is formed into cross-sectionally H-shaped configuration to have pressure receiving surfaces 131a and 131b. The valve spool 131 are biased in both direction by means of centering springs 132 and 133. The centering springs 132 and 133 are cooperative to each other to maintain the valve spool 131 at a predetermined neutral position. The valve spool 131 is formed with an annular groove 131c for selectively establishing and blocking fluid communication between radial paths 117e and 117f formed through the circumference of the spool body 117. The associated edges of the annular groove 131c and the radial paths 117e and 117f form variable orifices 134 and 135.

With the shown construction, separated first and second expansion fluid flow route as shown by arrows $E_1$ and $E_2$ are established for fluid flow during piston expansion stroke. Similarly, the first and second compression fluid flow route as illustrated by arrows $C_1$ and $C_2$ are established for piston compression stroke. In both cases, the second fluid flow routes $E_2$ and $C_2$ may be blocked by shifting of the valve spool 131 to the HARD mode position when the vibration frequency is lower than a predetermined frequency and magnitude of fluid pressure in the associated one of the pressure chamber $D_1$ and $D_2$ is higher than a set pressure of the set spring 132 and 133.

With the shown embodiment, constant flow area orifices 134 and 135 and the variable orifices defined by the combination expansion and compression damping high valves 106, 107, 108 cooperate to establish substantially linear variation characteristics of the damping force through overall piston speed range.

It should be appreciated, as discussed in the former embodiment, the action of the valve spool 131 is limited to be effective only in response to the vibration frequency lower than a predetermined frequency, which predetermined frequency may be set at a frequency corresponding to the border of the unsprung mass induced vibration and sprung mass induced variation. This can be achieved by the combination of the expansion check plate 114, the expansion orifice plate 115 and expansion seat plate 116; and compression check plate 120, which serves as the cutting high frequency component.

While the present invention has been discussed in terms of the preferred embodiment of the invention, the invention can be embodied in various fashion. Therefore, the invention should be appreciated to include all possible embodiments and modifications thereof which can be implemented without departing from the principle of the invention which is set out in the appended claims.

For instance, though the second embodiment has been discussed with respect to the piston valve construction, the specific valve construction discussed therein is applicable not only for the piston valve but also as a flow restrictive check valve. Such check valve may be used in place of the check valve in the first embodiment.

FIGS. 7 to 9 show one example of application of the composite valve construction as a check valve. In the shown example, the check valve is applied in a piston assembly of a shock absorber. In such case, the composite check valve assembly is installed in an internal space of a fastening nut 201 which is engaged to the lower end of the piston rod (not shown) to fix the piston assembly. The fastening nut 201 has a larger diameter section 211 in which is defined a check valve receptacle chamber 211a communicated with an axial opening 210a of the fastening nut 201.

In the shown construction, the composite check valve assembly has a check plate 202 also formed with a thin plate and is formed with arc shaped through openings 220. As can be shown, the expansion check plate 202 has a ring shaped circumferential section 221, a central and essentially circular valve section 222 and a radial stem section 223 extending between the sections 221 and 222. An orifice plate 203 is also formed with a thin plate and formed with a center opening 230 having smaller diameter than that of the valve section 222 of the check valve 202. The orifice valve 203 is also formed with a pair of arc-shaped elongated openings 231 connected between the center opening 230 via narrow cut-out sections 232. The radial position of the openings 232 corresponds to the radial position of the arc-shaped opening 220 of the check plate 202. Furthermore, the circumferential length of the arc-shaped opening 231 is longer than the circumferential width of the radial stem section 223 of the check plate 202.

The expansion seat plate 204 is formed of a relatively thick plate and is formed with a center opening 240 which has smaller diameter than that of the center opening 230a of the orifice plate 203.

With the shown construction, if the fluid pressure at the side of the seat plate 204 is higher than the side of the check plate 202, the valve section 222 of the check plate 202 is shifted away from the center opening 230 of the orifice plate 203 to permit fluid flow therethrough. On the other hand, when the fluid pressure at the side of the check plate 202 is higher than the side of the seat plate 204, the valve section 222 is maintained in seated position on the orifice plate 203 so as to block fluid flow through the center opening 230. In such case, the fluid flow is established only through the arc-shaped elongated openings 231. With the shown construction, flow direction dependent fluid flow restriction can be provided.

What is claimed is:

1. A variable damping force shock absorber for an automotive suspension system, comprising:
   a hollow cylinder tube defining first and second fluid chambers therein;
   first and second fluid flow routes through which said first and second fluid chambers are in communication for fluid flow therethrough;
   a first damping valve disposed within said first fluid flow route for generating a first damping force;
   a second damping valve disposed within said second fluid flow route for generating a second damping force less than the first damping force;
   a vibration frequency responsive valve disposed within said second fluid flow route and movable between a first position for permitting fluid flow therethrough and a second position for blocking fluid flow therethrough, said vibration frequency responsive valve facing a pressure chamber at one axial end, said pressure chamber being in communication with one of said first and second fluid chambers via a vibration frequency dependent flow restriction means so as to establish fluid pressure in said pressure chamber for shifting said vibration frequency responsive valve from said first position to said second position in response to a vibration in a frequency range corresponding to a mode of vibration induced by action of an unsprung mass of the vehicle; and
   a biasing means associated with said vibration frequency responsive valve for exerting biasing force for normally urging said vibration frequency responsive valve to said first position.

2. A variable damping force shock absorber as set forth in claim 1 wherein said first damping valve comprises a resiliently deformable disc valve seated at a plurality of valve seats arranged in tandem fashion with respect to said first fluid flow route.

3. A variable damping force shock absorber as set forth in claim 2, wherein said first damping valve comprises a first disc valve seated on an inner valve seat and a second disc valve seated on an outer valve seat, and said outer valve seat defining a constant path area orifice providing minimum fluid flow path area.

4. A variable damping force shock absorber as set forth in claim 1, wherein said vibration frequency dependent flow restriction means comprises an orifice means which blocks fluid flow from one of said first and second fluid chambers to said pressure chamber, generated by a mode of vibration induced by a sprung mass so as to maintain the fluid force exerted on said vibration frequency responsive valve smaller than the biasing force exerted by said biasing means in a direction opposite to said fluid force.

5. A variable damping force shock absorber as set forth in claim 4, wherein said vibration frequency dependent flow restriction means comprises a flow restrictive orifice.

6. A variable force shock absorber as set forth in claim 5, wherein said vibration frequency dependent flow restriction means includes an orifice means defining a first larger area fluid path and a second smaller area path, a check valve assembly associated with said orifice means for constantly permitting fluid flow through said second smaller area fluid path in a limited flow rate and for permitting fluid flow through said first larger area fluid path in a first direction and blocking fluid flow through said first larger area fluid path in a second direction opposite to said first direction.

7. A variable damping force shock absorber as set forth in claim 6, wherein said vibration frequency dependent flow restriction means further comprises a seat means defining a third fluid flow path having smaller path area than said first larger area fluid path and oriented in alignment with said first larger area fluid path, and said orifice means is seated on said seat means and formed of a resiliently deformable plate for causing deformation for establishing fluid communication between said second smaller area fluid path and said third fluid flow path.

8. A variable damping force shock absorber as set forth in claim 7, wherein said check valve means is responsive to said first direction of fluid flow flowing from said pressure chamber to one of said first and second fluid chambers and to said second direction of fluid flow flowing from one of said first and second fluid chamber to said pressure chamber.

9. A check valve assembly as set forth in claim 6 which permits fluid flow in a greater flow rate in a first direction and in a smaller flow rate in a second direction opposite to said direction, comprising:

an orifice means defining a first larger area fluid path and a second smaller area path; and a check valve means associated with said orifice means for constantly permitting fluid flow through said second smaller area fluid path in a limited flow rate, permitting fluid flow through said first larger area fluid path in said first direction and blocking fluid flow through said first larger area fluid path in said second direction opposite to said first direction.

10. A check valve assembly as set forth in claim 9, further comprising a seat means defining a third fluid flow path having smaller path area than said first larger area fluid path and oriented in alignment with said first larger area fluid path, and said orifice means is seated on said seat means and formed of a resiliently deformable plate for causing deformation for establishing fluid communication between said second smaller area fluid path and said third fluid flow path.

11. A variable damping force shock absorber for an automotive suspension system, comprising:

a hollow cylinder tube defining first and second fluid chambers therein;

first and second fluid flow routes through which said first and second fluid chambers are in communication for fluid flow therethrough;

a first damping valve disposed within said first fluid flow route for generating a first damping force;

a second damping valve disposed within said second fluid flow route for generating a second damping force less than the first damping force;

a vibration frequency responsive valve disposed within said second fluid flow route and movable between a first position for providing a predetermined maximum fluid flow path area and a second position for providing a predetermined minimum fluid flow path area, said vibration frequency responsive valve facing a pressure chamber at one axial end, said pressure chamber being in communication with one of said first and second fluid chambers via a vibration frequency dependent flow restriction means which is exclusively responsive to fluid pressure variation frequency so as to establish fluid pressure in said pressure chamber for shifting said vibration frequency responsive valve from said first position to said second position in response to a vibration in a frequency range corresponding to a mode of vibration induced by action of an unsprung mass of the vehicle; and a biasing means associated with said vibration frequency responsive valve for exerting biasing force for normally urging said vibration frequency responsive valve to said first position.

12. A variable damping force shock absorber for an automotive suspension system, comprising:

a hollow cylinder tube defining first and second fluid chambers therein;

first and second fluid flow routes through which said first and second fluid chambers are in communication for fluid flow therethrough;

a first damping valve disposed within said first fluid flow route for generating a first damping force;

a second damping valve disposed within said second fluid flow rotue for generating a second damping force smaller than the first damping force;

a vibration frequency responsive valve disposed within said second fluid flow route and movable between a first position for providing a predetermined maximum fluid flow path area and a second position for providing a predetermined minimum fluid flow path area, said vibration frequency responsive valve facing a pressure chamber at one axial end, said pressure chamber being in communication with one of said first and second fluid chambers via a vibration frequency dependent flow restriction means so as to establish fluid pressure in said pressure chamber for sequentially and continuously shifting said vibration frequency responsive valve between said first position and said second position depending upon vibration frequency so that damping characteristics can be adjusted sequentially between a predetermined most soft characteristics at said first position of said vibration frequency responsive valve and a predetermined most hard characteristics at said second position of said vibration frequency responsive valve; and a biasing means associated with said vibration frequency responsive valve for exerting biasing force for normally urging said vibration frequency responsive valve to said first position.

* * * * *